Figure 1:
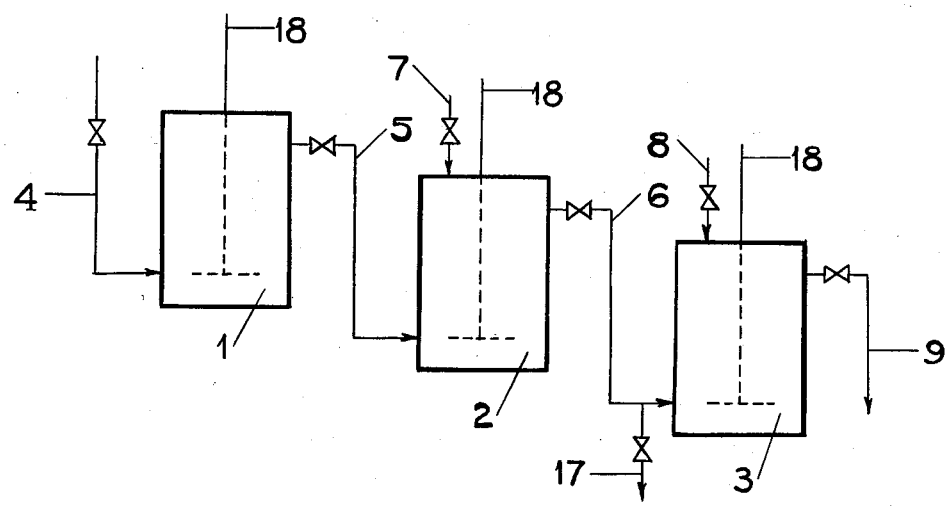

Feb. 26, 1952     W. K. WILSON     2,587,562
CONTINUOUS EMULSION POLYMERIZATION
PROCESS FOR VINYL ACETATE
Filed Nov. 22, 1948

*INVENTOR.*
WILFRED K. WILSON
BY F. M. Murdock
        attorney

Patented Feb. 26, 1952

2,587,562

UNITED STATES PATENT OFFICE 2,587,562

CONTINUOUS EMULSION POLYMERIZATION PROCESS FOR VINYL ACETATE

Wilfred K. Wilson, Springfield, Mass., assignor to Shawinigan Resins Corporation, Springfield, Mass., a corporation of Massachusetts Application November 22, 1948, Serial No. 61,317

3 Claims. (Cl. 260—89.1)

This invention relates to a continuous process for the emulsion polymerization of polymerizable compounds having a $CH_2=C<$ group.

Attempts to continuously polymerize aqueous emulsions of compounds having a $CH_2=C<$ group, such as vinyl acetate, have led to surprisingly poor results. For example, the size of the polymer particles in emulsions produced by continuously flowing a mixture of monomer, water, dispersing agent and catalyst through a heated zone, is unduly large.

It is an object of this invention to provide a new process for the continuous polymerization of compounds containing a $CH_2=C<$ group in aqueous emulsion.

A particular object of this invention is to provide a process for continuously polymerizing an aqueous emulsion of a compound containing a $CH_2=C<$ group to produce an emulsion with unusually small polymer particles.

These and other objects are accomplished according to the invention by continuously flowing a polymerizable compound containing a $CH_2=C<$ group through a polymerization zone in admixture with an aqueous solution of a dispersing agent for said compound, said solution containing a polymer of said polymerizable compound which has been polymerized therein.

According to a particular embodiment of the invention, the dispersing agent solution is prepared by continuously passing the ingredients thereof in admixture through a heated polymerization zone to polymerize the monomeric compound prior to passage through the main polymerization zone.

According to one embodiment of the invention, the product resulting from passage through the main polymerization zone is subsequently passed through another heated polymerization zone so as to bring about the polymerization of all but traces of monomeric material expeditiously.

Figure 2:
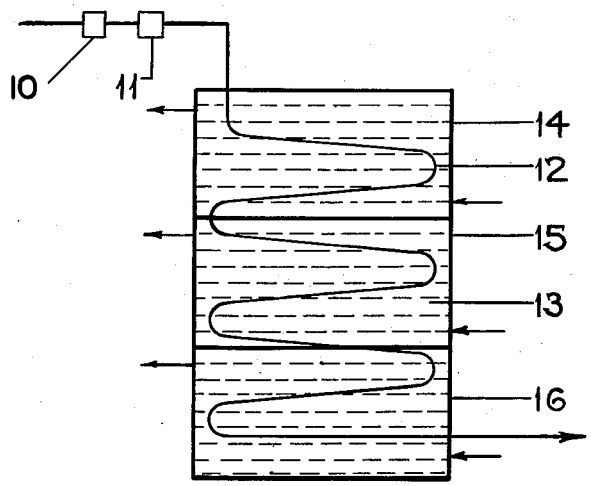

In the drawing:

Fig. 1 is a flow sheet showing diagrammatically one method of carrying out the invention; and Fig. 2 is a flow sheet showing diagrammatically one type of polymerization pot which may be used.

Referring to Fig. 1 of the drawing, the main polymerization zone is indicated at 2, the preliminary polymerization zone for carrying out the polymerization of a portion of the monomeric material in the presence of the dispersing agent is indicated at 1, otherwise designated as a "seeding pot," and the final polymerization zone is indicated at 3 which may also be designated as a "finishing pot." It is to be understood that the invention in its broad aspects does not require the use of a finishing pot, since the function of this polymerization zone may be carried out by other means. However, the number and arrangement of polymerization zones as shown in the drawing represents an effective method of carrying out the process of the invention.

In the drawing, means for introducing the components of the charge to seeding pot 1 is indicated at 4. Means for drawing off the finished product from pot 1 and charging the same to polymerization pot 2 is indicated at 5. Corresponding means for drawing off the product of pot 2 and charging the same to pot 3 is indicated at 6. Means for charging pots 2 and 3 with additional ingredients are indicated at 7 and 8, respectively. At 9 is indicated means for withdrawing the product from pot 3. The product may then pass through a water-cooled condenser or other heat exchange means to cool the product, for example, to room temperature. Pots 1, 2 and 3 are furnished with suitable means (not shown) for heating and cooling the same.

In the event that the polymerization is completed in pot 2, discharge means 6, instead of passing to pot 3, is connected by line 17 with drums or other storage means (not shown), preferably with intermediate heat exchange means for cooling the product.

In order to further illustrate the process of the invention, an example is given below employing a particular polymerization charge wherein the monomeric material is vinyl acetate. Where parts are mentioned, they are parts by weight.

Example I

Seeding pot 1 is initially filled with a polyvinyl acetate emulsion made by heating and stirring the following charge:

| | Parts |
|---|---|
| Vinyl acetate | 15 |
| Water | 167 |
| Hydroxy ethyl cellulose (10% aqueous solution) | 77 |
| Sodium sulfonate of dodecyl benzene (5% aqueous solution) | 24 |
| Potassium persulfate | 1.2 |

Thereafter, while stirring the contents of pot 1, the same ingredients that were used in preparing the initial charge are continuously charged to the pot in the same proportions while at the same time withdrawing the polymerization product at the same rate as the ingredients are added.

The main polymerization pot 2 is initially charged with a polyvinyl acetate emulsion made by heating and stirring a mixture of the following ingredients:

| | Parts |
|---|---|
| Vinyl acetate | 50 |
| Water | 48 |
| Hydroxy ethyl cellulose | 1.3 |
| Sodium sulfonate of dodecyl benzene | 0.2 |
| Potassium persulfate | 0.2 |
| Sodium bicarbonate | 0.15 |

This initial emulsion is preferably prepared in accordance with the process set forth in my copending application Ser. No. 677,902, filed June 19, 1946, now U. S. Patent 2,508,341, although the method of preparation is relatively immaterial since in a continuous process the initial charge forms a relatively small proportion of the final product.

There are now continuously introduced into the main polymerization pot 2 the product of the reaction in the seeding pot, together with the following ingredients while continuously stirring the contents:

| | Parts |
|---|---|
| Vinyl acetate | 285 |
| Water | 20 |
| Sodium bicarbonate | 0.9 |

The relative rates of addition of the two streams of materials are such as to introduce the 285 parts of monomeric vinyl acetate in the time required to introduce an amount of the product from the seeding pot which contains 15 parts of polyvinyl acetate.

In carrying out the process of the invention according to this example, the temperature in the seeding pot 1 is maintained at 70–75° C. and the temperature in the main polymerization pot 2 is maintained a 80–85° C.

As in the case of the seeding pot 1, the polymerization product of the main polymerization pot 2 is withdrawn at a point removed from the point of addition of the ingredients at the same rate as the ingredients are introduced. After several hours of operation, it is found that the particle size of the polymer produced has come to an equilibrium value of 1.0–1.5 mu average diameter with a distribution spread from less than 0.5 mu up to somewhat over 6 mu. Furthermore, it is found that the resulting emulsion is of high quality as indicated by the following characteristics:

Storage stability—there is no indication of creaming and very little sludge formation after standing for several months;
Acidity—(calculated as acetic acid) 0.2%
pH—4.1
Solids content—48.7%
Film properties—on plasticization with 8 parts of triethylene glycol dihexoate for every 100 parts of emulsion, the product on evaporation yields a clear film which resists re-emulsification when immersed in water.

The proportion of the total monomer which is polymerized in the seeding pot may be varied within substantial limits. However, usually not over 50% and preferably 1–25% of the total amount of the final polymer is produced in this zone. Therefore, the ratio of monomer added to the polymerization zone to the polymer which was formed in the seeding pot is between 50–99 parts monomer for every 50–1 parts of polymer.

In any event, it is preferred that the ratio of dispersing agent to monomer in the seeding pot 1 be at least twice and preferably more than four times, the ratio of dispersing agent to monomer in the main polymerization zone 2.

The rate of flow of the charge to the seeding pot is usually correlated with the polymerization temperature, amount of catalyst and other factors affecting the rate of polymerization so as to polymerize substantially all of the monomer. However, the presence of unpolymerized material in the effluent from the seeding pot is not harmful, provided at least 1% of the total amount of polymer is produced at this stage. Usually, the various factors affecting the rate of polymerization are so correlated as to discharge an amount of product from the seeding pot equivalent to its capacity in 5–60 minutes.

The amount of catalyst used in the seeding and main polymerization pots is correlated with the temperature and nature of the polymerizable material to produce a controllable reaction which does not require an unduly long time and which produces a polymer of the desired characteristics. Usually, a sufficient amount of a peroxide catalyst is used to supply 0.001 to 0.1 part of available oxygen for every 100 parts of water. For most normally liquid polymerizable materials, a polymerization temperature of 30–100° C. is found to be advantageous.

Instead of conducting the polymerization in a series of pots equipped with agitators 18 as shown in Fig. 1 of the drawing, the polymerization may be carried out in a tube as shown in Fig. 2. Thus, the ingredients may be passed through a proportioning pump 10 followed by a turbulent flow tube 11 to convert the charge into an emulsion and then through a tube or coil 12 surrounded by a fluid heat exchange medium 13, such as water. When a variable polymerization temperature is desired, the polymerization tube 12 may pass through a series of chambers 14, 15 and 16, containing heat exchange media at different temperatures.

The type of polymerization apparatus shown in Fig. 2 may be used in place of the main polymerization pot and/or the seeding pot and any finishing pots.

Usually the various factors affecting the rate of polymerization are so correlated as to permit the discharge of a uniform product from the pots subsequent to the seeding pot at such a rate as to be equivalent to the capacity of the pot in 0.5–8 hours.

The type of dispersing agent which may be used may be varied to suit the particular requirements of the polymerizable material being used and the characteristics desired in the product. For example, for some purposes polyvinyl acetate emulsions are desired in which the dispersing agent is made up solely of a surface tension depressant or wetting agent, while in other cases a protective colloid such as polyvinyl alcohol having dispersing properties or a combination of a wetting agent and a protective colloid is desired. The latter type of dispersing agent is used in the illustrative example.

In the event that the main polymerization zone comprises an extended tube or pipe, as shown in Fig. 2, the problem of polymerizing all but traces of monomer is not serious since there is no tendency for the monomer to by-pass any of the polymerization zone. Thus, the length of the zone may be adjusted to give the monomer content desired in the product.

The extent of the polymerization in the main polymerization zone may be substantially varied depending on the results desired. When the type of apparatus shown in Fig. 1 is used, the monomer content of the effluent from the main polymerization pot 2 may be readily maintained at less than 5%. However, due to the difficulty involved in avoiding "short circuiting" of monomer from the point of introduction to the point of exit, some saving in time may be effected by providing one or more finishing pots in series with the main polymerization pot and passing the product from the main polymerization pot to a finishing pot while the monomer content is still relatively high, e. g., 5-25%.

Thus, the finishing pot may serve several purposes, i. e., expediting the polymerization of the monomer, effecting polymerization of all but traces of monomer, e. g., all but 1% or less, and permitting polymerization at more than one temperature.

The process of the present invention is applicable to polymerizable compounds generally which contain a terminal ethylene group ($CH_2=CH<$). Thus, various vinyl or vinylidene compounds and mixtures thereof may be used, as for example, vinyl esters of organic acids, such as vinyl acetate, vinyl propionate, vinyl butyrate, vinyl benzoate; vinyl halides, such as vinyl chloride and vinyl bromide; vinylidene halides, such as vinylidene chloride and vinylidene bromide; olefine benzenes, such as styrene, alpha methyl styrene, ortho chlorostyrene, para chlorostyrene and various polymerizable polychlorostyrenes; hydrocarbons such as iso-butene and 1,3-butadiene; vinyl ketones such as methyl vinyl ketone and ethyl vinyl ketone; vinyl ethers, such as vinyl butyl ether; vinyl or substituted vinyl group-containing acids and esters thereof such as crylic acid, methacrylic acid, methyl acrylate, ethyl acrylate, and methyl methacrylate and the like.

While the normally liquid polymerizable compounds of the type set forth above form a preferred class to be polymerized according to the invention, normally gaseous polymerizable compounds may be polymerized by operating under sufficient pressure to liquefy the compounds at the temperature used.

Particularly valuable and unexpected results are obtained on polymerizing vinyl esters of lower aliphatic acids containing 2-6 carbon atoms such as vinyl acetate, vinyl propionate, vinyl butyrate, vinyl valerate and vinyl hexoate and mixtures thereof.

The dispersing agent may comprise a surface tension depressant or wetting agent which may be one or more of the well known wetting agents, as for example, anionic, cationic, or non-ionic wetting agents, such as the alkali metal, ammonium and amine salts of long chain fatty acids, for example, sodium oleate, sodium palmitate, potassium stearate, Marseilles soap, diethanol amine laurate; alkali metal sulfonates of aliphatic or alkylaromatic hydrocarbons of high molecular weight, such as the alkyl naphthalene sulfonic acids, for example, isobutyl naphthalene sulfonic acid; sodium lauryl sulfate; salts of monsulfonates of alkyl esters of dicarboxylic acids, for example, the sodium salt of dioctyl sulfosuccinate, sodium diisobutyl naphthalene sulfonate; dodecyl benzene sodium sulfonate, decyl benzene sodium sulfonate, sodium disulfonate of dibutyl phenyl phenol, sodium sulfonate of higher synthetic secondary alcohols, sodium alkyl naphthalene sulfonate, aryl alkyl polyether alcohols, quaternary ammonium derivatives of the pyridine betaine type made from a blend of fatty acids.

It is frequently desirable, as illustrated by the examples, to include a hydrophilic colloid in making emulsions according to the process of this invention. Examples of suitable colloids are polyvinyl alcohol, partially hydrolyzed polyvinyl acetate, for example, polyvinyl alcohol, containing up to 10% acetate groups. These colloids are especially suitable when they are made from polyvinyl acetate having a viscosity of over 7 centipoises as determined in a one-molar solution at 20° C. Other suitable colloids are soluble starch, soluble starch degradation products, the methyl ether of cellulose, water-soluble glycol cellulose, gum tragacanth, gum acacia, sodium alginate, agar-agar, gum tragon, gum arabic, glue, gelatine, hydroxy ethyl cellulose, sodium carboxyl methyl cellulose and the like.

According to a preferred embodiment of the invention, vinyl acetate is polymerized in emulsion form in the presence of a dispersing agent comprising both a wetting agent and a hydrophilic protective colloid as illustrated by the examples. Only small amounts of these materials are generally desirable in order not to deleteriously affect the properties of the product. On the other hand, a certain minimum is necessary for proper stability of the emulsion both during and after polymerization. Usually 0.01–2% and preferable 0.1–1% wetting agent and 1–10% protective colloid based on the water are found to produce especially valuable products.

Various water-soluble per compounds may be used in place of the potassium persulfate employed in the examples, such as hydrogen peroxide, per-acetic acid, sodium perborate, potassium perborate, sodium persulfate, potassium persulfate, sodium peroxide, potassium peroxide, urea peroxide and the like. The amount employed is usually such as to contain 0.001–0.1 part of available oxygen for every 100 parts of water.

In making aqueous emulsions of polymerized vinyl compounds according to the process of the invention, the ratio of water to polymerizable compound may be varied substantially. Usually it is desirable that the weight ratio of water to polymerizable compound does not exceed 90:10, since the yield of polymer per unit volume of the reaction vessel becomes unduly small. Generally, much lower amounts of water are used, e. g., weight ratios of water to polymerizable compound of between 60:40 and 40:60. Usually, the weight ratio of water to polymerizable compound is not lower than 30:70 since the viscosity of the polymerizing mixture becomes too high to permit adequate agitation.

It is obvious that many variations may be made in the processes and products of this invention without departing from the spirit and scope thereof as defined in the appended claims.

What is claimed is:

1. A continuous aqueous emulsion polymerization process which comprises polymerizing monomeric vinyl acetate in water in the weight ratio of vinyl acetate to water of between 60:40 and 40:60, by continuously adding to a polymerization zone, (1) unemulsified vinyl acetate and (2) a dispersion of polyvinyl acetate in an aqueous solution of a dispersing agent, the monomer and polymer being added in the ratio of 50–99 parts of monomer for every 50–1 parts of polymer, polymerizing the vinyl acetate in the polymerization zone and continuously withdrawing the emulsion product.

2. A process as described in claim 1 in which the withdrawn emulsion product contains not over 25% of the monomer which was added to the polymerization zone.

3. A process as described in claim 1 in which the withdrawn emulsion product containing unpolymerized monomer is flowed through a second polymerization zone, polymerizing the monomer and continuously withdrawing the emulsion from the second polymerization zone.

WILFRED K. WILSON.

REFERENCES CITED

The following references are of record in the file of this patent:

UNITED STATES PATENTS

| Number | Name | Date |
|---|---|---|
| 2,404,779 | Arnold | July 30, 1946 |
| 2,475,016 | De Nie | July 5, 1949 |

FOREIGN PATENTS

| Number | Country | Date |
|---|---|---|
| 612,331 | Great Britain | Nov. 11, 1948 |